Figure 1:
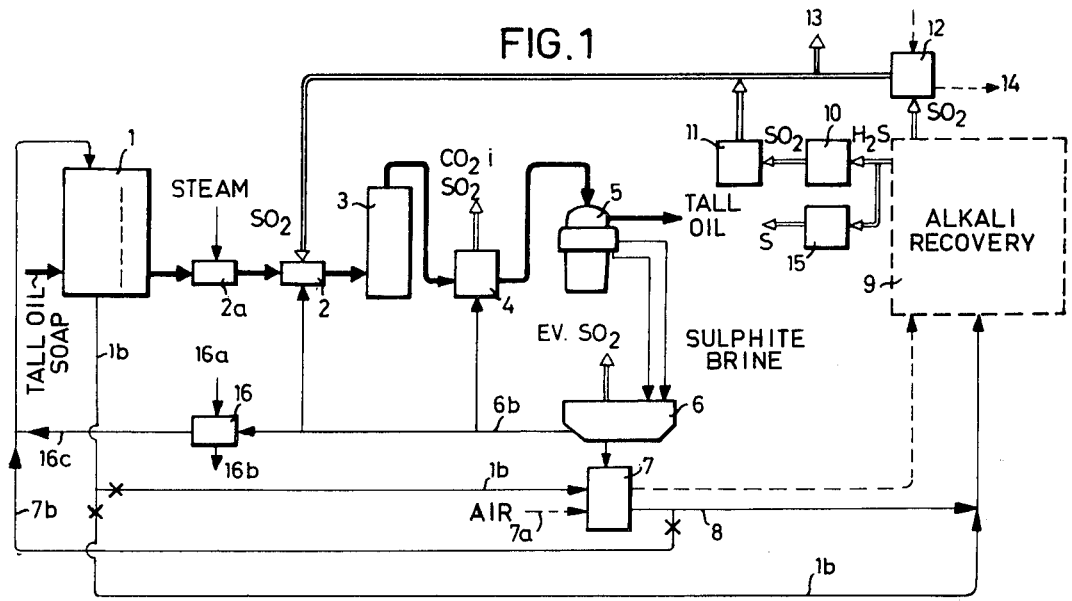

United States Patent [19]

Mannbro

[11] 4,005,060
[45] Jan. 25, 1977

[54] METHOD, APPLIED IN THE PRODUCTION OF TALL OIL, OF PREVENTING OR REDUCING THE EMISSION OF ODOROUS SULPHUR COMPOUNDS AND/OR ACID SULPHUR COMBUSTION PRODUCTS FROM THE BLACK LIQUOR RECOVERY PROCESS IN ALKALINE PULPING

[75] Inventor: Nils Viktor Mannbro, Asarum, Sweden

[73] Assignee: Skogsagarnas Industri Aktiebolag, Vaxjo, Sweden

[22] Filed: Dec. 23, 1974

[21] Appl. No.: 535,343

[30] Foreign Application Priority Data

Jan. 11, 1974 Sweden .............................. 7400366

[52] U.S. Cl. .............................. 260/97.7; 162/16; 162/29
[51] Int. Cl.² .......................................... C09F 1/00
[58] Field of Search ........................ 260/97.5, 97.7; 159/47 WL; 162/16, 29, 30, 33, 34, 35, 36, 37, 38, 41–45

[56] References Cited
UNITED STATES PATENTS

| | | | |
|---|---|---|---|
| 2,248,978 | 7/1941 | Francisco ........................ | 260/97.7 |
| 2,296,952 | 9/1942 | Ross et al. ...................... | 260/97.7 |
| 2,430,029 | 11/1947 | Pollak et al. .................... | 260/97.7 |
| 2,561,150 | 7/1951 | Stephenson et al. ............. | 260/97.7 |
| 2,611,682 | 9/1952 | Mannbro ......................... | 162/37 |
| 2,734,037 | 2/1956 | Mannbro ......................... | 162/38 |
| 2,738,270 | 3/1956 | Nelson et al. ................... | 162/33 |
| 2,801,264 | 7/1957 | Thomsen ......................... | 162/16 |
| 3,366,535 | 1/1968 | Cann .............................. | 162/30 |
| 3,575,952 | 4/1971 | Morris et al. ................... | 260/97.7 |
| 3,647,363 | 3/1972 | Chari et al. ..................... | 162/29 |

Primary Examiner—S. Leon Bashore
Assistant Examiner—Peter F. Kratz
Attorney, Agent, or Firm—Young & Thompson

[57] ABSTRACT

A method of preventing or reducing the emission of odorous sulphur compounds and/or sulphur combustion products from the black liquor recovery tall oil splitting processes in kraft pulping of pines is described. Sulphur dioxide and/or bisulphite is first reacted with black liquor sulphidic compounds occluded in the soap skimmings simultaneously with the soap acidulation by using a pressure vessel at a temperature of approximately 100°–110° C. Then the sulphite solution with the sulphur compounds thus obtained is separated and further utilized for stabilizing sulphides in various kraft pulping process liquors, preferably the black liquor. Alternatively, the sulphite solution can be passed through a neutral sulphite semichemical (NSSC) pulping arranged for spent liquor cross-recovery with the kraft process. The sulphur dioxide is substituted either for conventionally used acid chlorine dioxide reactor effluent or sulphuric acid. The process may regenerate sulphur dioxide for splitting.

1 Claim, 2 Drawing Figures

METHOD, APPLIED IN THE PRODUCTION OF TALL OIL, OF PREVENTING OR REDUCING THE EMISSION OF ODOROUS SULPHUR COMPOUNDS AND/OR ACID SULPHUR COMBUSTION PRODUCTS FROM THE BLACK LIQUOR RECOVERY PROCESS IN ALKALINE PULPING

In alkaline pulping of softwood (kraft pulping) the fatty and resin acids comprised in the various extractive substances are saponified. These soaps solubilize also non-saponifiable extractive substances and form together black liquor skimmings which are removed from the top of the black liquor tanks. By soap splitting the recovered quantity of tall oil amounts to about 45 kg per metric ton of pulp from fresh pine logs (less from stored chips) and to about 10 kg from spruce.

Splitting soap to free acids in the form of tall oil is carried out preferably with sulphuric acid or sulphuric acid-containing effluent from chlorine dioxide preparation for pulp bleaching. Sodium hydrosulphate has been employed earlier for the splitting and the utilization of other acid agents such as sulphite spent liquor and hydrogen sulphite is also known from several publications. In kraft mills having chlorine dioxide bleaching it is advantageous in the recovery of the reactor effluent to have this effluent at least in part neutralized by means of acidulation of the soap as well as therein occluded black liquor. The risk for emission of hydrogen sulphide and for lignin precipitation deriving from the black liquor is hereby lower than if all of the reactor effluent is mixed with black liquor at a single point. The development of hydrogen sulphide from the soap splitting and the odor herefrom demands, however, from an environmental protection viewpoint, effective refuse destruction such as in incinerators. Environmental protection measures, or more properly more advanced techniques and systems for process closing, have reduced the make-up for covering sodium losses with the different liquors. Formerly a make-up of $Na_2SO_4$ was preferably employed which — in addition to giving the name to the sulphate process — produced a beneficial sulphidity in the liquors. The sulphidity adjusted itself spontaneously into equilibrium with make-up and sulphur losses to the atmosphere of i.e. $SO_2$ and $H_2S$. At present, however, the sulphidity can be higher than what is regarded as beneficial since a number of measures have been taken to reduce the release of sulphur. Thus in the make-up of the sulphate process, sodium products having negligible or no sulphur content such as caustic soda, sodium carbonate and by-product formate etc. must be substituted for the sodium sulphate. Furthermore, advanced process closing can mean that the sulphuric acid or sulphate ion content of the splitting liquid and/or the reactor effluent, respectively, will require balancing with additional sulphur-free sodium make-up until the chemical balance sheet indicates that the built-up of chemicals has reached the breaking point where disposal of sodium, e.g. green liquor or $Na_2SO_4$, recovered in the process becomes necessary. This development is accelerated in that sulphidity raised through process closing produces more odorous gases from pulping which in turn result in demands for environmental protection measures, for example black liquor oxidation and scrubbing of black liquor combustion gases and treatment, e.g. incineration, of odorous gases from the rest of the process.

The chlorine dioxide reactor effluent containing sodium originating from sodium chlorate can be eliminated in accordance with new and already marketed methods for chlorine dioxide production. The new methods no longer avail themselves of sulphur dioxide for chlorine dioxide production but instead utilize sodium chloride together with sulphuric acid, or alternatively hydrochloric acid, for the attainment of the hydrogen ion concentration suitable for the raction of the chlorate. Supplied sodium is led away from the system as crystallized sodium sulphate, alternatively as sodium chloride. Sodium chloride from various sources lends itself to in situ electrolytic reoxidation to chlorate and, optionally, to chlorine gas. If hydrochloric acid gas is required for the chlorine dioxide reactor, chlorine may be burned with hydrogen obtained from electrolysis. When chloride separation for chlorine generation is integrated with the kraft process, soap splitting can be achieved by means of HCl.

Practical application has already been attained for the SVP process developed by Rapson. In the SVP process chlorate, chloride and sulphuric acid are reacted and produce chlorine dioxide, containing some chlorine, and crystallized sodium sulphate, suitable as make-up, is obtained as by-product. Kraft pulp mills having tall oil recovery cannot, however, to the full extent utilize these new chlorine dioxide processes because they still demand a supply of sulphuric acid. A complementary process has also been presented by Rapson to control the ratio of $H_2SO_4$ to $Na_2SO_4$ in the chlorine dioxide reactor effluents.

Chlorine dioxide effluent can contain residues of oxidizing chlorine compounds and contains, in any event, chlorine compounds which occur as hydrochloric acid during the soap splitting. Problems of corrosion can be overcome in most cases with special steels and alloys. In closed systems for bleaching it is necessary to restrict any supply of chlorides to the alkali regeneration process. Formation of hydrogen sulphide caused by the contact of sulphuric acid or chlorine dioxide effluent with black liquor requires a particular gas exhaust system and odor control. Similarly, lowering of the pH value for the black liquor by addition of $H_2SO_4$ leads to increased emission of $SO_2$ and $H_2S$ with the flue gases from the black liquor combustion furnaces. Only in exceptional cases can the multiple effect evaporation of the water content of the splitting acid residue be managed since the $H_2SO_4$ releases more $H_2S$ and gives rise to incrusts of gypsum and double sulphates which incrustation in certain cases is aggrevated by lignin precipitates caused by locally excessive $H_2SO_4$ concentrations. In the black liquor combustion the lowered alkalinity caused by $H_2SO_4$ again leads to increased release of sulphur compounds which, of course, were not stabilized by sulphate.

The present invention eliminates or reduces to a substantial degree the release of odorous sulphur compounds from both the tall-oil plant and from mixtures of splitting liquid with the kraft process liquors as well as solving the problems with chloride and sulphate ions when using reactor effluent for tall oil splitting. This technical advance is achieved by use of $SO_2$ for soap splitting in a closed reaction vessel under continuous supply of soap and $SO_2$. A solution of $NaHSO_3$ and $SO_2$ is hereby formed. This splitting liquid residue is reacted with $Na_2S$ and sulphide sulphur compounds in various liquors by the novel method whereby at mixing the formation and release of $H_2S$ are essentially totally prevented. Instead thiosulphate and other sulphur compounds, e.g. colloidal sulphur and polythionates, are formed. The splitting liquid residue releases some $CO_2$ and $SO_2$ which is easily recovered for, for example, pulp bleaching or is absorbed in a pulping process liquor or in a soap tank.

By means of splitting, free resin and fatty acids are obtained in the tall oil and in the splitting liquid residue sodium ions which primarily can be accounted for as sodium sulphite compounds. In what follows the splitting liquid is therefore designated sulphite solution.

The separation of the tall oil can be carried out in the normal way but care must be taken that the sulphite solution receives the proper concentration or density for tall oil separation and washing of crude soap. Use of $SO_2$ gas does not entail the same dilution with water as $H_2SO_4$ solution or chlorine dioxide effluent. The salt concentration, i.e. the sodium sulphite concentration, can be controlled by recycling a portion of the sulphite solution to the soap that is fed to the reaction vessel.

Sulphite solution can, alternatively, be used to advantage for washing the crude soap and suitably in connection with centrifuging. Washing with acidic sulphite solution can be carried out with essentially total suppression of those reactions which characterize the conventional handling of splitting liquid produced by acidulation with sulphuric acid. The sulphate ion of the sulphuric acid cannot react with sulphide ions while, on the contrary, sulphite ions according to the invention take part in a complex of redox systems comprising compounds of sulphur at various stages of oxidation.

If it is desirable according to the invention to neutralize the sulphite solution prior to the soap washing, a sulphide-containing liquor can be used under conditions which substantially prevent emission of the toxic hydrogen sulphide, It is, per se, possible to split soap in open vessels with admission of $SO_2$ to the reaction mixture at the bottom of the vessel, e.g. according to U.S. Pat. No. 2,430,029, but the important sulphide reaction according to this invention demands closed vessles and overpressure to prevent release of gases. The total pressure is dependent on the partial pressure of the $SO_2$ at prevailing temperature. The reactions in the splitting vessel are accelerated by increased temperature. If the same temperature is used as in normal splitting with $H_2SO_4$, i.e. 90–100° C, splitting with hydrogen sulphite/$SO_2$ requires longer time. Higher temperature should then be used for $SO_2$/hydrogen sulphite splitting; not so high, however, that the tall oil components react with $SO_2$/hydrogen suphite. If sulphonation of the lignin residue occurs it becomes partially water-soluble in a similar way as lignin dissolved in sulphite pulping spent liquor. In conventional soap splitting with dilute $H_2SO_4$, the rate of reaction is a momentary reaction involving hydrogen and sodium ions. Since $SO_2$ is an equilibrium with $HSO_3^-$ and $H^+$ as successively reacting products, longer time and/or higher temperature is required for soap splitting according to the present invention. Acids formed in the sulphite solution can be partly utilized by recirculation to the soap splitting vessel. The choice of temperature range will generally depend on the time of residence in the splitting vessel, but the temperature should not exceed about 130° C. At higher temperature, the sulphonation reactions characteristic for sulphite pulping cannot be avoided, even when the time of residence in the soap splitting vessel is short. According to tests, about 110°–120° C is a suitable temperature and, in batch soap splitting, the splitting takes place in less than 1 hour. In continuous soap splitting, with direct introduction of steam, the splitting can be accomplished in 10–30 minutes or less. In newer plants according to the Alfa-Laval system, splitting with $H_2SO_4$ under overpressure takes place in several minutes and said plants are also well-suited for splitting with $SO_2$. The $SO_2$ consumption is about 10–15% calculated on the weight of the soap and depending on its black liquor content and the recycling of the sulphite solution.

Separation of the tall oil from the sulphite solution can be accomplished by settling for a few hours or more in an continuous or batch decanter whereby a lignin phase is separated under the oil phase and thereunder sulphite solution. However, separation with continuous centrifuges of either Sharple's or Alfa-Laval's design is to be preferred. For washing out impurities retained in the crude soap, splitting spent liquid, i.e. sulphite solution, from which precipitated lignin has been removed, is preferred. According to the present invention, sulphite solution can be neutralized with green liquor or white liquor with substantially no release of $H_2S$. Suitably, the sulphite solution, which may also contain hydrogen sulphite, is introduced into a neutral or somewhat alkaline mixture with respective liquors.

The local formation of $H_2S$, sometimes simultaneous with lignin precipitation, which is characteristic for $H_2SO_4$ splitting spent solution, is not caused by sulphite solution since sulphur compounds are bonded by means of a sequence of reactions which also contribute to increasing the pH value of the mixture, i.e. increase the hydroxide ion concentration. This neutralization can suitably be carried out under supply of air or other oxygen containing gas, or with bleaching effluents containing oxygen and/or peroxides. A fast conversion of sulphide with sulphite to principally thiosulphate hereby takes place. It is known that polysulphides are formed as an intermediate which react with sulphite forming thiosulphate.

It is essential that all of the sulphite solution fractions be introduced into the recovery process, including the lignin fraction. The conventional $H_2SO_4$ splitting solution is difficult to recover since it precipitates gypsum and other incrust-formers if one attempts to mix it with liquors to the digester or black liquor and optionally via the causticizing plant. Incrusts of gypsum or double sulphates containing $Na_2SO_4$ are formed in the digester circulation system and on its heating surfaces. During evaporation of the recovered black liquor, sulphate ions from conventional splitting with $H_2SO_4$ give rise to said types of incrusts in the evaporator tubes and on other heating surfaces. If insufficient residual alkali from the digestion is left in the black liquor, the decrease in alkalinity caused by the splitting solution can give rise to lignin plugs in the evaporator tubes which, due to incrustation, lose their liquor flow balance.

From the Silfate method (U.S. Pat. No. 2,738,270, Nelson and Mannbro) it is known that sulphite pulping spent liquors, which participated in a suphate cook, can be processed as black liquor. The sulphite solution may, according to the present invention, also be processed as neutral sulphite pulping spent liquor (NSSC-liquor) for so-called cross-recovery. Of interest in the present context is the preparation of NSSC-cooking liquor from black liquor directly. According to Swedish Pat. No. 184,310 (Mannbro), black liquor is sulphited so that sodium sulphite cooking acid or NSSC-cooking liquor and by-product lignin precipitate are obtained. Suitably $H_2S$ is driven off first by acidification with $CO_2$, whereafter the carbonated black liquor is sulphited with $SO_2$. The acid lignin precipitate may contain tall oil which can be extracted.

$H_2S$ driven off from various liquors, e.g. according to U.S. Pat. No. 2,611,682 (Mannbro), can be burned to $SO_2$ intended for tall oil digestion according to the present invention or alternatively for NSSC-digestion and optionally for bleaching purposes. It has been shown that sulphite solution according to the invention is advantageously used as NSSC-cooking liquor. For NSSC-pulp intended for the production of corrugating board, lignin precipitate from the soap splitting may pass the NSSC-cook.

A particular advantage with the present invention is that the tall oil which, emulsified, accompanies the sulphite solution and lignin sludge allows itself to be recovered in that these products can be added with the charge of subsequent kraft cooks. In this way the emulgated oil contributes to the soap that is obtained in the black liquor. Otherwise these materials are burned together with the evaporated black liquor.

New kraft digestion methods allow increase in the pulp yield with unchanged consumption of oxidizing bleaching agent based on percent of the weight of the pulp. These methods are based on a pretreatment of the chips with sulphide compounds, $H_2S$, $S^{2-}$ or $SH^-$ and/or polysulphides. Sulphur dioxide can be easily produced from $H_2S$ which can be recovered by acidification of kraft process liquors. When necessary, elementary sulphur may be discharged from the recovery process, as has been discussed elsewhere for the Silfate method.

Pulp bleaching with oxygen/alkali is facilitated by regeneration of the alkali. Regeneration takes place by separating sodium carbonate and/or sodium hydrogen carbonate from $Na_2S$ or, for example, $H_2S$. The abovementioned yield-increasing kraft digestion methods combined with oxygen/alkali bleaching are consequently well suited for soap splitting according to the present invention.

Bleaching of said kraft pulps with oxygen allows a closed system with no polluting effluents between the washing plant for black liquor recovery from the brown stock and the direct transfer of the washed brown stock to the oxygen stage according to U.S. Pat. No. 3,830,688 (Mannbro).

For continued bleaching of oxygen delignified pulp, preferably more chlorine dioxide is used than after pre-bleaching with chlorine-alkali or chlorine-alkali-hypochlorite sequences. The increased amount of chlorine dioxide requires conversion to an effluent-free technique for chlorine dioxide manufacture, for example the SVP method. The SVP method generates no sulphuric acid effluent but, rather, generates crystallized sodium sulphate. This sulphate will determine the composition of the other make-up components with respect to the sulphur/sodium ratio in the highly closed process, including the tall oil plant. When the chlorine dioxide reactor effluent has been eliminated, delivery of $H_2SO_4$ to the process solely for soap splitting cannot be accepted.

When chlorine dioxide is produced with NaCl as the only raw material and with caustic soda as a by-product, it is often economically advantageous to supply any further sodium make-up with $Na_2SO_4$ and, according to the invention, use $SO_2$ for soap splitting. Depending on the sulphur balance of the process, one can choose between a new supply of $SO_2$ and regeneration in situ of $SO_2$ over $H_2S$ or by scrubbing black liquor combustion gases.

Absorption of dilute $SO_2$ and $SO_3$ from combustion gases can, according to known methods, be carried out with water or solutions from which concentrated $SO_2$ can then be driven off. For concentration or liquefaction of $SO_2$, systems known from sulphite pulp technique, e.g. the Celleco system, can be used. To obtain $SO_2$ gas at a concentration suitable for injection into a soap splitting vessel the technique can be used which has been applied for multi-stage sulphite pulping with injection of $SO_2$ into one of the cooking stages. A portion of the $SO_2$ can also be used for bleaching purposes and for preparation of NSSC liquor in a so-called cross-recovery system.

The Silfate principle for cross-recovery can (U.S. Pat. No. 2,734,037, Mannbro) be applied on sulphite splitting solution. By using sulphite solution for dissolving recovered soda smelt, steam consumption for evaporating the splitting solution is eliminated and less condensate and sulphides will be discharged from the evaporation step. Causticizing plants having belt-filters of the Eimco type are well suited to the Silfate principle.

No disturbing gypsum precipitates are formed from the sulphite solution during causticizing and less odor is noticed from the alkaline cooking step which follows after pre-treatment of the chips with sulphides, for example polysulphide. To facilitate the causticization, centrifuging of the reaction mixture from the soap splitting is preferably extended so far that the sulphite solution is essentially freed from emulsified oil and soap residues which can affect separation of the lime mud. The fraction of emulsifed matter can, per se, be added to the digester or be mixed with causticized liquor, i.e. white liquor, prepared from the sulphite solution.

New applications of cross-recovery involve processing of effluent from alkaline oxygen delignification (oxy effluent) and other bleaching effluents. The sulphite solution and oxy stage effluent can be mixed and utilized for NSSC pulping (oxy stock denotes oxygen delignified brown stock).

The attached drawing illustrates the invention.

Figure 2:
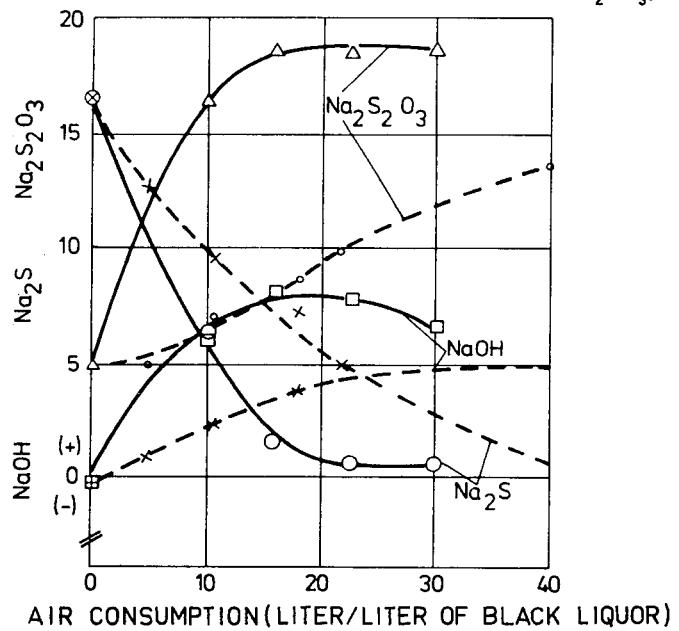

FIG. 1 shows a principal diagram of how tall oil splitting according to the invention is connected to the kraft recovery process; and FIG. 2 is a graph of various components of the black liquor versus air consumption.

Soap is fed to a mixer 2 together with $SO_2$. Steam is preferably added in a pre-mixer 2a prior to acidification. The splitting of soap into the resin and fatty acids and other tall oil acids takes place in the reaction vessel 3. Overpressure in the reaction vessel 3 affects conversion of all sulphides with $NaHSO_3$ and $SO_2$. $CO_2$ and some $SO_2$ is released from the degassing vessel 4, said $SO_2$ subsequently being absorbed for recovery. The mixture of tall oil and sulphite solution is led to a centrifuge 5 where tall oil is separated from one fraction of clarified sulphite solution and one fraction of precipitated lignin suspended in sulphite solution. The amount and consistency of the lignin precipitate is governed by the extent to which the lignin has been sulphonated during the splitting and, in some instances, lignin sulphonic acids can be formed similarly to those in sulphite spent liquors. Sulphite solution is recirculated from 6 through the line 6b to the degassing vessel 4 and, according to requirements, back to the splitting through the mixer 2. Excess splitting solution is treated in a vessel 7 containing neutralized or slightly alkaline reaction mixture with for example green liquor or white liquor. In this way emission of $H_2S$ is prevented. The sulphur compounds are especially effectively fixed if the mixing takes place by means of air through the line 7a. Part of the neutralized sulphite splitting solution is employed via the line 7b in the soap wash 1 to separate black liquor from the crude soap. The mixture of black liquor and neutralized splitting solution is conveyed through the line 1b to the kraft mill chemical recovery plant 9 and is well-suited to convey the lignin sludge via line 8 to the black liquor after the pH-increasing oxidation involving sulphite and sulphides.

Sulphur compounds in the black liquor combustion flue gas and from incinerators for odorous gases are returned to the recovery process and are successively regenerated in the form of $Na_2S$ in the soda smelt and in liquors of dissolved smelt. $H_2S$ is stripped from these liquors, preferably in connection with separation of $Na_2S$ and $Na_2CO_3/NaHCO_3$ for pulping purposes or bleaching purposes, respectively. The $H_2S$ is burned in an furnace 10 to $SO_2$ which, via a concentrating plant 11, is obtained either as compressed or liquefied $SO_2$. From the $SO_2$ plant 11 said products alternatively $SO_2$ water can be drawn off for sulphite cooking liquor preparation or pulp bleaching, respectively.

$SO_2$ can be absorbed from the flue gases in a scrubber 12 and from the scrubber liquid concentrated $SO_2$ can be produced and either led to the soap splitting 2 or to other users 13. The sulphite containing scrubber liquid or another dissolved sodium-sulphur compound from the scrubber or supplementary reaction steps is recovered through line 14 to the pulp production process. Disposal of elementary sulphur can take place via the furnace 15.

Sulphite solution can otherwise be neutralized 16 with any available alkali 16a and the resulting solution 16b can be utilized for NSSC pulping besides soap wash

EXAMPLE 1

The following comparative tests were carried out with splitting of a soap which was recovered in a mill with a common black liquor system for the birch and softwood pine and spruce pulping lines:
  a. Conventional splitting with 30% $H_2SO_4$. Boiling under atmospheric pressure with a reflux condenser for 15 minutes.
  b. Through-bubbling of $SO_2$ as above. Boiling for 100 minutes.
  c. Pressure heating with $SO_2$ in an autoclave. 60 minutes at 110°–115° C.

After splitting the tall oil was separated and acid numbers were determined with the following results:
  a. 133–142
  b. 119–120
  c. 133–139

From the closed soap splitting according to c) no $H_2S$ evolved and tall oil was obtained having the same acid number on the average as with above-mentioned conventional $H_2SO_4$ splitting (a). Splitting in open vessel (b) gives a low acid number and emission of unreacted $H_2S$ was evident.

EXAMPLE 2

Degassed sulphite solution from the splitting according to c) above was reacted with black liquor from the mill pulp-washing plant by using same proportions as in mill operation. No precipitation occurred. Also lignin precipitate was admixed under stirring of the mixture by means of air. During this period all the lignin gradually redissolved and the pH of the black liquor mixture successively increased by aeration.

To analyze the effect of the sulphite solution without having to correct for dilution, comparative oxidation tests were carried out after addition of $Na_2SO_3$. A black liquor containing sulphide equivalent to 16.5 g $Na_2S$ per liter black liquor was used. In this black liquor the original NaOH had been completely consumed and, in addition, alkali in the form of hydrolyzed $Na_2S$ equivalent to 0.36 g NaOH/liter black liquor. Two batches of black liquor were oxidized with air, one as original and another after addition of 13.3 g $Na_2SO_3$ per liter black liquor. During oxidation the temperature was held at 80° C in the black liquor. A novel technique was applied which enabled exact measurement of $O_2$ consumption in the oxidation of the black liquor with air. It was found that by means of the addition of $Na_2SO_3$ to the black liquor, the oxidation of $Na_2S$ consumed only half the volume of air and oxygen respectively, as compared with conventional black liquor with no addition.

FIG. 2 shows the relationship between the black liquor consumption of atmospheric oxygen and the changes in the black liquor content of $Na_2S$, $Na_2S_2O_3$ and NaOH. $Na_2SO_3$ from splitting solution alters the course of reaction for the sulphide content of the black liquor. $Na_2SO_3$ hereby reacts with polysulphides and probably with other intermediates from $Na_2S$ so that a considerable surplus of NaOH is formed, which is utilized for redissolving precipitated lignin. Simultaneously, sulphur compounds are bonded as $Na_2S_3O_3$, whereby departure of volatile, odorous sulphur compounds from evaporation and black liquor combustion is initiated. Only a minor amount of $Na_2SO_4$ is formed if the reaction time is limited to the optimum of the NaOH curve for the reactions of $Na_2SO_3$ with black liquor. Black liquor with no addition of sulphite from soap splitting has the NaOH curve at lower level exhibiting no optimum.

For oxidation down to 1 g $Na_2S$ per liter black liquor, the black liquor consmues 39 liters of air per liter black liquor, while sulphite from soap splitting reduces the air demand to 18 liter per liter black liquor. For these points the alkalinity values of the black liquors are 4.5 g NaOH/liter and 8.0 g NaOH/liter, respectively. Alkali useful for the neutralization of the sulphite solution is thus produced by the reaction between sulphite and sulphide while sulphate from conventional sulphuric splitting solution is not at all capable of oxidizing the sulphide or to react with any other sulphur compound.

Many kraft mills have not installed black liquor oxidation, but the spontaneous oxidation when the black liquor contacts the air in brown stock washing and screening is also enhanced by $Na_2SO_3$ from the splitting solution. When the evaporated black liquor is injected into the oxidizing zone in the black liquor furnace, instantaneous oxidation of sulphide sulphur to $Na_2S_2O_3$ is enhanced, of which a major part reaches the reduction zone where $Na_2S$ is formed for utilization in the cooking liquor. In contrast hereto, $H_2SO_4$ splitting solution increases the emission of $H_2S$ and its combustion products with the flue gas.

The rigid control exercised by the authorities on the release of $H_2S$ and acid sulphur compounds such as $SO_2$ and $SO_3$ from black liquor recovery boilers emphasizes the importance of recovering soap splitting solution with sulphide binding acid and not with sulphide stripping acid. In addition to common kraft pulping and its variants, the invention also embraces alkaline pulping in the presence of sulphite and sulphide compounds as well as pulping in the presence of sulphur compounds which produce black liquor, which on acidification emits hydrogen sulphide or other odorous sulphide sulphur compounds.

What I claim is:

1. In a method of reducing the emission of sulphur compounds from chemical regeneration processes for black liquor from alkaline wood pulping, in which crude soap is separated from the black liquor and subjected to acid soap splitting using sulphur dioxide and bisulphite, an acid reaction mixture being formed containing tall oil and sulphite brine and lignin sludge from which the tall oil is separated from the sulphite brine and the lignin sludge fraction, all the brine and lignin sludge being introduced into the chemical regeneration process for pulping liquor containing sulphide compounds; the improvement comprising preventing the emission of odorous and toxic sulphide-derived compounds from the soap-splitting by conducting said splitting in a single stage in which the soap is heated by steam injection to a temperature of about 110° C for a period of up to 1 hour in a closed soap-splitting vessel at super-atmospheric pressure while simultaneously injecting sulphur dioxide into said vessel to react with odorous and toxic compounds, reducing the contents of said vessel to atmospheric pressure whereby substantially only $SO_2$ and $CO_2$ are emitted from said brine.

* * * * *